(12) United States Patent
Lamschick

(10) Patent No.: US 7,188,716 B2
(45) Date of Patent: Mar. 13, 2007

(54) CURRENT COLLECTOR

(75) Inventor: Jürgen Lamschick, Wedel (DE)

(73) Assignee: Schunk Metall und Kunststoff GmbH, Wettenberg (DE)

( * ) Notice: Subject to any disclaimer, the term of this patent is extended or adjusted under 35 U.S.C. 154(b) by 153 days.

(21) Appl. No.: 10/508,951

(22) PCT Filed: Feb. 3, 2004

(86) PCT No.: PCT/EP2004/000965

§ 371 (c)(1), (2), (4) Date: Oct. 13, 2004

(87) PCT Pub. No.: WO2004/069579

PCT Pub. Date: Aug. 19, 2004

(65) Prior Publication Data

US 2005/0236244 A1 Oct. 27, 2005

(30) Foreign Application Priority Data

Feb. 3, 2003 (DE) ............... 103 04 379
Feb. 15, 2003 (DE) ............... 103 06 376

(51) Int. Cl.
*B60L 5/00* (2006.01)

(52) U.S. Cl. ................ 191/49; 191/45 R

(58) Field of Classification Search ....... 191/45 R, 191/50, 57, 58, 59, 59.1, 60, 60.2, 60.3, 64, 191/65, 66, 68, 70, 49, 90, 87, 67
See application file for complete search history.

(56) References Cited

U.S. PATENT DOCUMENTS

| 1,000,779 | A | * | 8/1911 | Case ................ 191/87 |
| 5,676,224 | A | * | 10/1997 | Clarke et al. ......... 191/49 |
| 6,152,273 | A | * | 11/2000 | Kilkenny ............ 191/58 |

FOREIGN PATENT DOCUMENTS

| AT | 297798 | | 4/1972 |
| DE | 3 321315 | | 12/1984 |
| DE | 8 709213 | | 10/1988 |
| GB | 177433 | | 3/1922 |
| JP | 5-146003 | * | 6/1993 |

* cited by examiner

*Primary Examiner*—Mark T. Le
(74) *Attorney, Agent, or Firm*—Dennison, Schultz & MacDonald

(57) ABSTRACT

Current collector for a third rail, including a base parallelogram extending from a vehicle, with a mounting for a collector shoe extending from the parallelogram, wherein the base parallelogram has a first leg running on the rail side, a second leg running along the first leg away from the rail as well as third and fourth legs connected in an articulating fashion with first and second ends, respectively, of the first and second legs. The mounting for the collector shoe is connected with a single leg adjustable in relation to the vehicle through at least one of its swivel axes, and the mounting is connected to the first or the fourth leg by means of at least one connection having a predetermined breaking point.

19 Claims, 4 Drawing Sheets

Fig. 7 Section G-G

Fig. 8 Section H-H

CURRENT COLLECTOR

Figure 1:
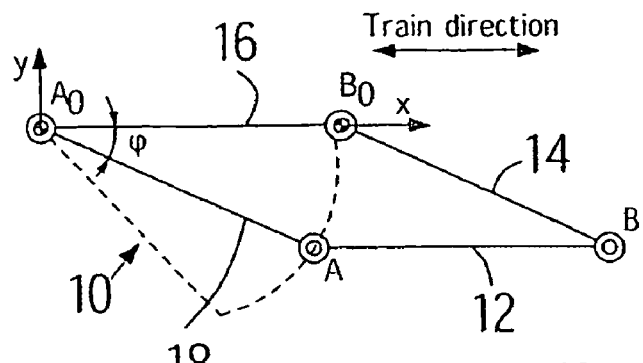

This application is a filing under 35 USC 371 of PCT/EP2004/000965, filed Feb. 3, 2004.

The invention refers to a current collector for a third rail comprising a base parallelogram extending from a vehicle, with a mounting for a collector shoe extending from said parallelogram, where the base parallelogram comprises a first leg running on the rail side, a second leg running along the first leg away from the rail as well as third and fourth legs connected in an articulating fashion with the first and second end, respectively, of the first and second leg. The mounting for the collector shoe is connected with a single leg adjustable in relation to the vehicle through at least one of its swivel axes.

In an equivalent current collector, the mounting for the collector shoe forms the first leg, which is connected in an articulating fashion with the adjoining legs. In order to prevent a complete destruction of the current collector e.g. in case the mounting or the collector shoe gets caught, predetermined breaking points are provided in both slanting legs. Since the forces acting upon the respective articulated point are different as a function of the travel direction of the vehicle, generally only one of the predetermined breaking points is destroyed in case of a malfunction. This means that at least across a short distance the mounting is carried along with the collector shoe, creating the risk that the current collector, its environment and the conductor rail may become damaged. Since moreover the conductors leading to the drive of the vehicle extend directly from the collector shoe or its mounting, tears may develop in various areas. Due to the fact that additionally all legs of the base parallelogram consist of metal, said parallelogram or a housing accommodating it and connected with the vehicle must be electrically insulated in relation the parallelogram e.g. by means of insulating plates or beams. Equivalent current collectors are also relatively heavy.

It is furthermore disadvantageous that, when the angle of inclination of the parallelogram leg leading to the mounting or the collector shoe in relation to the third rail is relatively large, the parallelogram's reaction to obstacles or its avoidance of such obstacles is different as a function of the direction of the vehicle, which likewise can lead to a high number of malfunctions and corresponding subsequent damage.

From DE 87 09 213 U1 we know of a current collector that comprises a collector shoe, which extends from a rocker arrangement.

We learn about a current collector that can be connected to a wire, said collector comprising a predetermined breaking point, in patent number AT 297 798.

GB 177 422 includes a current collector for a third rail with a parallelogram, from which a collector shoe extends.

It is the object of the present invention to further design a current collector of the aforementioned kind such that a neutral behavior in relation to obstacles is created, i.e. equally good avoidance occurs regardless of the travel direction of the vehicle. Furthermore the current collector should be relatively lightweight. Moreover, in the case that impermissibly high forces act upon the mounting or the collector shoe, detachment from the base parallelogram shall be possible without running the risk that said parallelogram itself be destroyed.

Pursuant to the invention, these goals are achieved with a current collector of the aforementioned kind provided that the mounting is connected with the first or the fourth leg by means of a connection comprising at least one predetermined breaking point.

If the mounting in the preferred case extends from the lateral leg that is adjustable in relation to the vehicle with its two swivel axes as the fourth leg, then the mounting could also extend from the first leg running on the rail side without deviating from the invention.

The mounting is connected with the corresponding leg by means of a connection comprising at least one predetermined breaking point. It is however preferred if the mounting is connected in particular by one or more groups of several connections such as bolts comprising a predetermined breaking point, respectively.

At the same time, the bolt, together with the contact surfaces of the mounting, forms an electrically conductive connection between the collector shoe and the leg.

The current conductor leading to the drive of the vehicle then extends from the leg itself so that the current conductor is not damaged when the mounting or the collector shoe is torn off.

Pursuant to another original suggestion which is part of the invention, it is provided that both the first and the second leg consist of electrically insulating material. This results in significant advantages for the current collector pursuant to the invention. For example, the material leads to decreased weight. Moreover, additional insulating measures are not required, which would otherwise become necessary when all legs of the base parallelogram consist of metal, as the current state of technology requires.

In order to ensure stable axial guidance of the current collector, it is furthermore provided that the second leg is formed by at least two bar-shaped elements such as rods. These could be connected in an articulating fashion with the third and fourth legs by means of dome-shaped receiving points, allowing freedom from torsion to be achieved.

To reduce the weight further, the first leg can be connected like a rocker by means of a hollow shaft with side flanges of a segment having a U-shaped profile of the current collector housing connected with the vehicle so that consequently a segment of the housing forms the third leg of the base parallelogram.

The fourth leg comprising the mounting and consisting of metal preferably contains two side flanges that are connected with each other, which are penetrated on one hand by the axes of oscillation from which the first and second legs extend and on the other hand by the connecting elements such as bolts in order to enable the mechanical and electrical connection to the mounting of the collector shoe.

Furthermore the connecting line between the swivel axes of the first leg to the third leg forms an angle $\phi$, which is $\leq 15°$ when the collector shoe is supported by the third rail. This results in a neutral behavior of the current collector in relation to obstacles, i.e. that an equally good reaction to such obstacles takes place regardless of the travel direction of the vehicle.

To ensure that the collector shoe can be connected with the third rail to the required extent and with the necessary pressure, a spring element such as a pressure spring, which is connected to the first leg, extends from the vehicle or the current collector housing. The articulated point here is selected such that during normal operation a constant pressure level is applied when the collector shoe rests on the third rail. If in case of a malfunction the current collector is lifted, the effective length of the pressure spring is shortened, while simultaneously shifting the articulated point such that automatic fastening occurs in the lifted position. Additional securing e.g. by means of a catch is possible.

For implementation purposes it is provided that a spring applying the pressure force onto the first leg extends from the housing or the vehicle, from a first articulated point, said spring being connected with the first leg in a second articulated point located such between its axes of rotation that the second articulated point runs between the third rail and the imaginary line between the first articulated point and the axis of rotation connecting the first with the second leg when the collector shoe is supported by the third rail and that in the case of a lifted position the second articulated point extends between the line and the vehicle or fastening of the housing to the vehicle, wherein the pressure force that is applied onto the second articulated point leads to an automatic fastening of the base parallelogram in the lifted position.

In a further development of the invention a pneumatically operating cylinder, which extends from the vehicle or the current collector housing and extends to the first leg running on the rail side, can act upon the current collector. Thus, among other things, a desired automatic lifting or lowering of the current collector may be performed.

Further details, benefits and features of the invention result not only from the claims, the features revealed therein—either alone and/or in combination with each other—, but also from the following description of preferred embodiments illustrated in the drawing.

Figure 2:
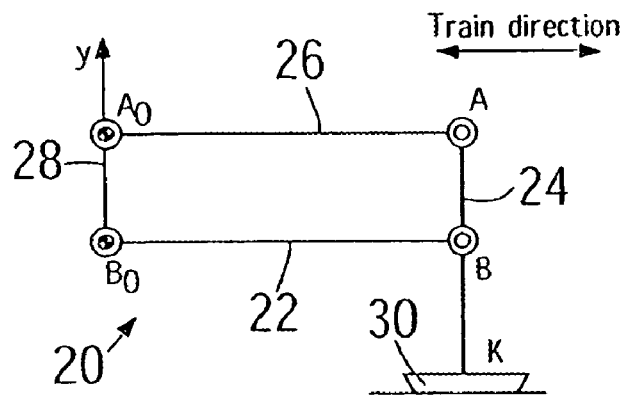
Figure 3:
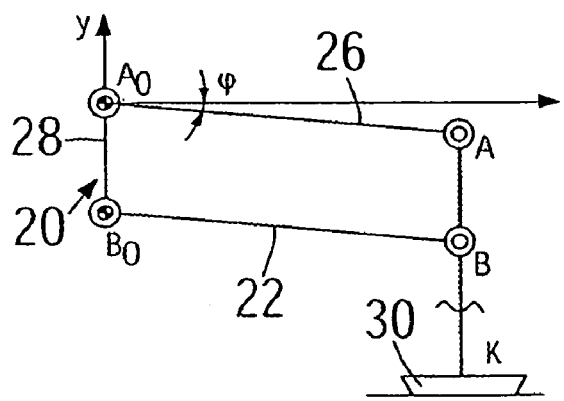
Figure 4:
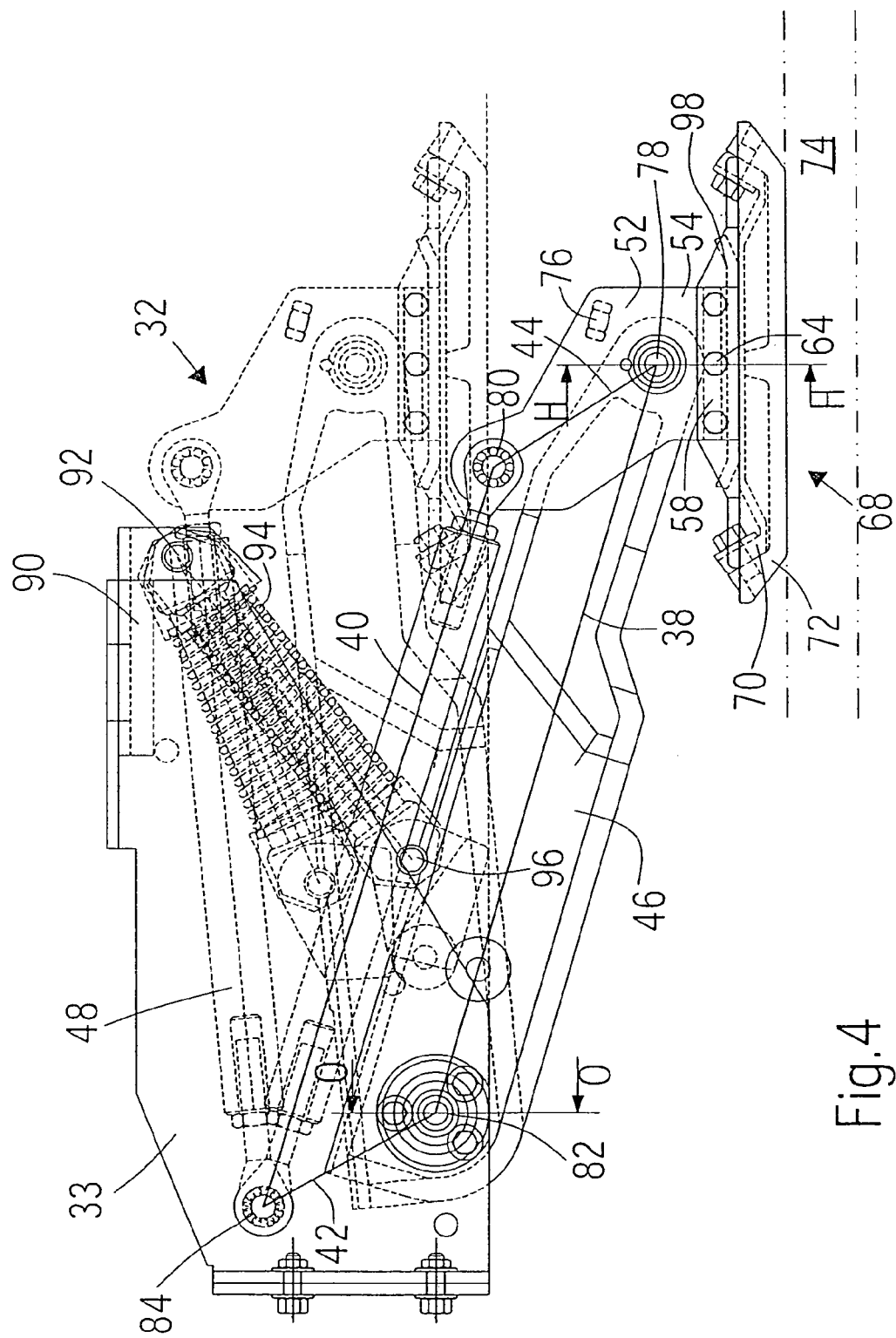
Figure 5:
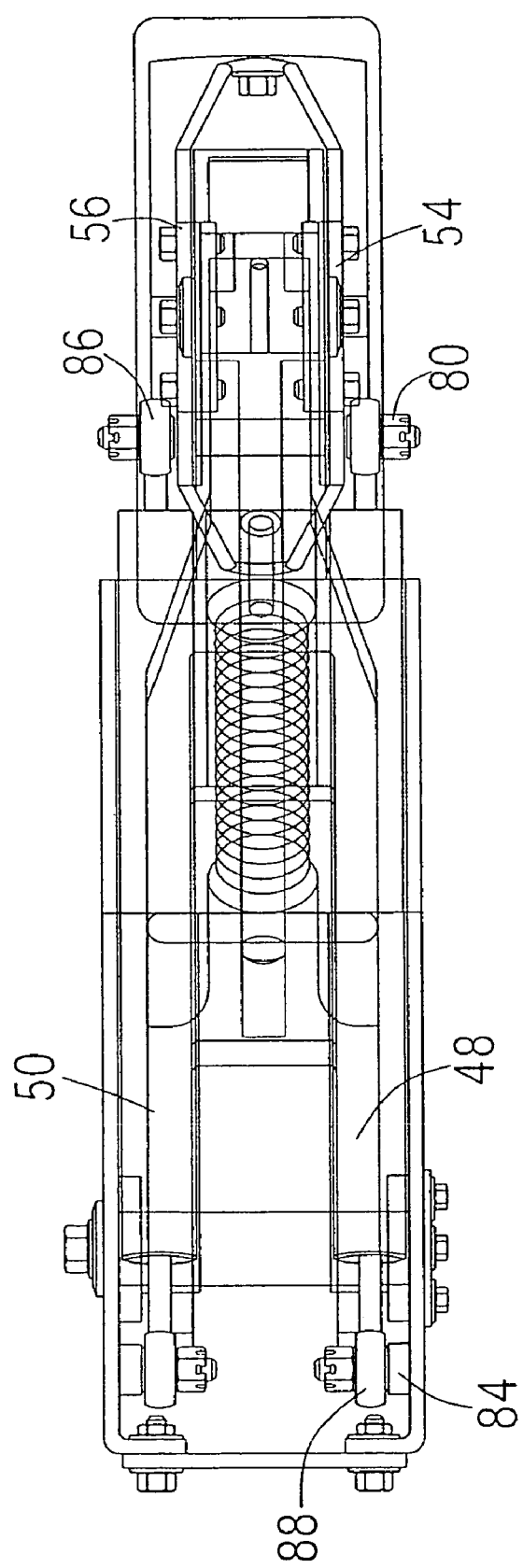
Figure 6:
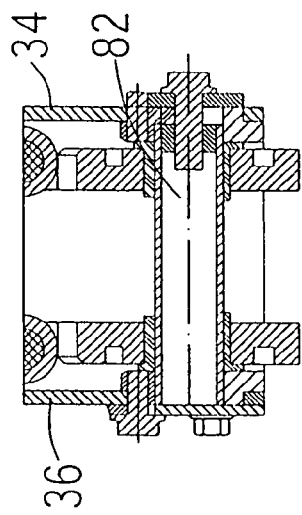
Figure 6:
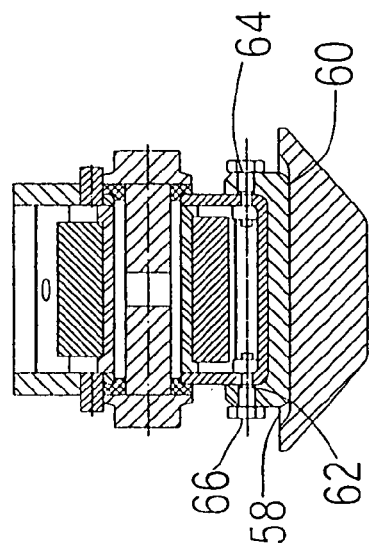
Figure 6:
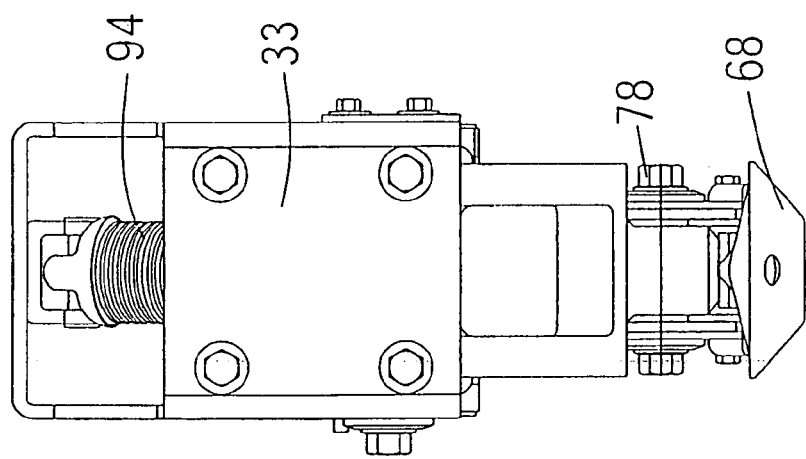

The drawing shows:

FIG. 1 a basic illustration of a current collector comprising a base parallelogram pursuant to the state of the art, FIGS. 2 and 3 basic illustrations of a current collector pursuant to the invention comprising a base parallelogram, FIG. 4 a side view of a current collector pursuant to the invention, FIG. 5 a top view onto the current collector from FIG. 4, FIG. 6 a rear view of the current collector from FIG. 4, FIG. 7 a section along the G—G line from FIG. 4, and FIG. 8 a section along the H—H line from FIG. 4.

The invention relates to a current collector for a third rail, as that used for electric power supply to electric drives of vehicles, e.g. in subways. According to current technology, familiar current collectors comprise a base parallelogram 10 that extends from a housing and is connected with the vehicle.

A base parallelogram 10 pursuant to the prior art comprises legs 12, 14, 16, 18, wherein the leg 12 extending on the rail side is formed by the collector shoe itself, via which the current flows to the drive. The collector shoe is connected to the adjoining lateral legs 14, 18 by means of predetermined breaking points in order to enable detachment in the case of impermissible occurring forces. This is meant to ensure that the entire current collector is not destroyed.

However, the design of the base parallelogram 10, the leg 16 connected firmly with the vehicle or the current collector housing, said leg being located away from the rail, and the setting angle of the legs 14, 18 in relation to the third rail leads to the disadvantage that, for one, pressure is applied to the predetermined breaking point as a function of the travel direction, so that in case of a malfunction the predetermined breaking points are not necessarily destroyed, and secondly equally occurring avoidance of obstacles is not given. Corresponding current collectors also are heavy and must be electrically insulated from the vehicle by means of insulating plates or corresponding elements.

In case of damage, extensive work is required. It is also disadvantageous that the conductor leading to the collector shoe and establishing the connection to the drive can may tear and thus generate flashovers.

All these disadvantages are avoided with the current collector pursuant to the invention, which is likewise based on the base parallelogram principle. It is shown in the basic illustrations in FIGS. 2 and 3 that in the case of a base parallelogram 20 pursuant to the invention, none of its legs 22, 24, 26, 28 is formed by a collector shoe 30. The leg 22 extending on the rail side is called the first leg, and the leg 26 extending parallel or substantially parallel thereto and located away from the rail is referred to as the second leg. The legs 28, 24 connecting the first leg and second leg 22, 26 are referred to as the third and fourth legs, wherein the third and fourth legs 28, 24 are preferably significantly shorter than the first and second legs 22, 26, as is shown not only in the basic illustrations of FIGS. 2 and 3, but also evident in particular from FIG. 4. This design of the leg lengths additionally also offers the benefit that favorable leverage forces are formed when the mounting 58 extends from the fourth leg 24.

Pursuant to the invention, the collector shoe 30 is not formed by any of the legs 22, 24, 26, 28 of the base parallelogram 20, but is rather connected to one of the legs comprising at least one adjustable swivel axis. In the example the collector shoe is connected to the fourth leg 24, also referred to as a lateral leg, or an extension thereto. Of course it would also be conceivable to connect the collector shoe 30 with the first leg 22 extending on the rail side or an extension thereof. Independent from this, there is the advantage that only one predetermined breaking point or a group of predetermined breaking points is required to safeguard detachment of the collector shoe 30 or the mounting accommodating the collector shoe 30 in case of a malfunction, wherein said mounting has been designated with the number 58 in FIG. 4.

Moreover, the remaining lateral leg—in the embodiment the lateral leg 28 or the third leg—is aligned in a stationary fashion with the vehicle, resulting in a small inclination angle between the legs 22, 26 extending along the third rail and the third rail, which leads to a neutral behavior in relation to obstacles. This means that regardless of the travel direction an equally good avoidance of obstacles is obtained. In particular the leg on the rail side or first leg 22 or a line connecting its swivel axes (in accordance with the first leg symbolizing leg 38 illustrated in FIG. 4) forms an angle $\phi$ with the third rail, preferably with $\phi \leq 15°$.

Further details of the current collector 20 according to the present invention are revealed in FIGS. 4 through 8.

A current collector 12 comprises a housing 33, which is connected with screws to the vehicle or its bottom. The parallelogram 20, which is symbolized in FIG. 4 by the lines 38, 40, 42, 44, is formed by a rocker 46 consisting of plastic and extending on the rail side as the first leg 38, two rods 48, 50 extending along said first leg as the second leg 40, likewise consisting of electrically insulating material, a segment of the housing 34 formed by side flanges 34, 36 as the third leg 42 as well as a U-shaped head part 52 with side flanges 54, 46 as the fourth leg 44.

Both the housing 34 and the head part 52 are made of metal. From the head part 52 a collector shoe mounting 58 extends, which in the embodiment is connected to the head part 52 by means of bolts 64, 66 comprising predetermined breaking points 60, 62. The number of bolts 64, 66 can be six, for example. The collector shoe mounting 58 is connected in turn with a collector shoe 68, which consists of a carrier part 70 and a working part 72, supported in a sliding fashion on a third rail 74, in order to conduct current. The working part 72 can be made of steel, brass, composite and/or carbon material. In this respect, reference is made to well known solutions and materials.

The bolts 64, 66, which can also be referred to as shearing pins, serve not only to establish a mechanical connection between the collector shoe mounting 58 and the head part 52 and hence the base parallelogram 20 of the current collector 32, but also to conduct current between the collector shoe 68 and a vehicle drive. The current is then supplied to the drive by means of a conductor, which is not shown, where said drive is connected in the area 76 with the head part 52 consisting of electrically conductive material. Thus, when the mounting 58 tears, the conductor extending from the head part 52 (fourth leg 44) is not damaged.

The head part 52 is connected to the rocker 46 or the rods 48, 50 by rotational axes 79, 80. The opposing ends of both the rocker 46, the first leg and the rods 48, 50, as well as the second leg are connected to the flanges 34, 36 of the housing 33 by means of rotational or swiveling axes 82, 84. The axis 82 is designed for weight saving reasons as a hollow shaft.

In order to enable a torsion-free connection between the fourth leg formed by the head part 52 and the third leg formed by the segment of the housing 33 with the second leg formed by the rods 48, 50, the rods 48, 50 comprise at their ends receiving sockets 86, 88, into which dome-shaped segments of the rotational axes 80, 84 engage, wherein the swivel 84 extending in the area of the third leg, i.e. the housing 33, is not continuous, but consists of two shaft ends. Furthermore, from the vehicle side segment 90 of the housing 33, specifically from a first articulated point 92, a pressure spring 94 extends, which is connected to the rocker 46 in a second articulated point 96. The second articulated point 96 is aligned in relation to a line connecting the rotational axis 82 with the first articulated point 92 such that the second articulated point 96 extends between the line and the third rail 74 when the collector shoe 68 rests on the third rail 74.

In the lifted position (dotted image in FIG. 4), the second articulated point 96 runs on the opposite side of the line, i.e. between it and the vehicle. This leads to an automatic mounting layout, which is reinforced by the fact that in the second lifted position the pressure spring 94 is shortened and hence larger forces are applied onto the rocker 46 via the second articulated point 96. Additionally, the raised position can be secured by catches or other retention devices, which are not illustrated.

Pursuant to the invention, the collector shoe 68 or its collector shoe mounting 58 extends from a leg adjustable in relation to the housing 33 or the vehicle by means of two swivel axes—in the embodiment the fourth leg 24, 44—, where said leg is formed by the head part 52. This way only one predetermined breaking point or a group of predetermined breaking points is required, which in the embodiment are formed by shearing pins 64, 66, ensuring that no further damage occurs to the current collector 32 when impermissibly high forces lead to a tearing of the mounting 58.

The fact that the current-conducting part, i.e. the collector shoe 68 with the mounting 58 and the head part 22, is electrically insulated towards the current collector housing 34 by means of the rocker 46 and the rods 48, 50 leads not only to significant weight savings, but to the additional benefit that further insulating measures towards the vehicle are not required. The presence of the two rods 48, 50 as the second leg 26, 40 of the base parallelogram 20 creates a guided axial alignment of the current collector 32 without necessitating additional guidance-related measures. At the same time, freedom from torsion is given by the bearings.

The pressure spring 94 furthermore ensures that when the collector shoe 68 rests on the third rail 74 pressure is applied evenly, whereby automatic mounting is given in the case of a lifted collector shoe 68.

By producing the first and second legs 22, 38, 26, 40 extending along the third rail 74 from plastic, vibrations and jolts are dampened, thus achieving greater running smoothness.

Furthermore an emergency running tab 98 extends from the rail side area of the head part 52, which can be supported in a sliding fashion by the third rail 44 when the running shoe 68 with its mounting 62 has torn, in order to be able to continue to drive the vehicle and reach a location where it can be repaired.

Additionally a pneumatic cylinder, which is not shown, can extend between the vehicle or the housing 33 and the rocker 46 in order to enable automatic lifting or lowering of the current collector, i.e. the collector shoe 68, with simple design measures.

The invention claimed is:

1. Current collector (32) for a third rail (74), comprising a base parallelogram (20) extending from a vehicle, with a mounting (58) for a collector shoe (30, 68) extending from said parallelogram and constructed and arranged for contact with the third rail below the collector shoe, wherein the base parallelogram comprises a first leg (22, 38) running on the rail side, a second leg (26, 40) running along the first leg away from the rail as well as third and fourth legs (24, 28, 42, 44) connected in an articulating fashion with first and second ends, respectively, of the first and second legs and wherein the mounting for the collector shoe is connected with a single leg adjustable in relation to the vehicle through at least one of its swivel axes, and wherein the mounting (58) is connected to the first or the fourth leg (22, 38, 46; 24, 44, 52) by means of at least one connection (64, 66) comprising a predetermined breaking point (60, 62).

2. Current collector pursuant to claim 1, wherein the mounting (58) for the collector shoe (68) is connected to a leg (24, 44, 52) that is adjustable in relation to the vehicle with its two swivel axes.

3. Current collector pursuant to claim 1, wherein the third leg (28, 42) connecting the first ends of the first and second legs (22, 26, 38, 40) is arranged in a stationary fashion in relation to the vehicle or housing (33) of the current collector (32) connected to said vehicle, in that the fourth leg (24, 44, 52) is adjustable in relation to the vehicle with its swivel axes (78, 80) connected to the first and the second leg, and in that the mounting (58) for the collector shoe (68) extends from the fourth leg.

4. Current collector pursuant to claim 1, wherein the mounting (58) is connected to the first or the fourth leg (22, 24, 38, 44) by means of several connections (64, 66), comprising a predetermined breaking point (60, 62), respectively.

5. Current collector pursuant to claim 1, wherein the collector shoe (68) is connected to the mounting (58) in an electrically conductive fashion by means of the connection or connections (64, 66).

6. Current collector pursuant to claim 1, wherein a current conductor leading to a drive of the vehicle extends from the leg (22, 24, 38, 44) connected to the mounting (52), from the fourth leg that is designed as a head part (52) of the current collector.

7. Current collector pursuant to claim 1, wherein an emergency running shoe (98), which can be supported by the third rail (74), extends from the fourth leg (24, 44) or the head part (52).

8. Current collector pursuant to claim 1, wherein the third leg (28, 42) is a segment of a housing (33) of the current collector (32).

9. Current collector pursuant to claim 1, wherein both the first leg (22, 38) and the second leg (26, 40) consist of electrically insulating material.

10. Current collector pursuant to claim 1, wherein the second leg (26, 40) is formed by at least two bar-shaped elements (48, 50).

11. Current collector pursuant to claim 1, wherein the first leg (22, 38) in relation to a line connecting its swivel axes (78, 82) forms an angle $\phi$ with the third rail (74), with $\phi \leq 15°$, when the collector shoe (68) is supported by the third rail.

12. Current collector pursuant to claim 1, wherein a spring element (94) spring, which applies a pressure force onto the first leg (22, 38), extends from the housing (33) of the current collector (32) or from the vehicle from a first articulated point (92), said element being connected with the first leg in a second articulated point (96), in that the second articulated point is located between the swivel axes (78, 82) of the first leg, in that the second articulated point runs between the third rail and a line connecting the first articulated point with the rotational axis connecting the first leg with the third leg (28, 42) when the collector shoe (68) is supported by the third rail (74), and in that in a lifted position of the current collector the second articulated point runs between the line and the vehicle or mounting of the housing (33) to the vehicle, wherein the pressure force acting upon the second articulated point leads to an automatic mounting layout of the base parallelogram (20) in the raised position.

13. Current collector pursuant to claim 1, wherein the first leg (22, 38), is connected by means of a hollow shaft (82) as the swivel axis to the side flanges of a segment of the housing (33) having a U-shaped profile, said side legs being the third leg.

14. Current collector pursuant to claim 1, wherein bar-shaped elements forming the second leg (26, 40) are connected to the third or fourth leg (24, 28, 42, 44) by means of dome-shaped seating points.

15. Current collector pursuant to claim 1, wherein the first leg and the second leg are short legs (24,28) and the third leg and the fourth leg are short legs, and the mounting (58) extends from a short leg (24) or an extension thereof.

16. Current collector pursuant to claim 4, wherein the connections comprise bolts.

17. Current collector pursuant to claim 5, wherein the connections comprise bolts.

18. Current collector pursuant to claim 10, wherein the bar shaped elements comprise rods.

19. Current collector pursuant to claim 12, wherein the spring element is a pressure spring.

* * * * *